US012592133B2

(12) United States Patent
Whytock et al.

(10) Patent No.: US 12,592,133 B2
(45) **Date of Patent: *Mar. 31, 2026**

(54) REPLAY ATTACK DETECTION

(71) Applicant: NCR Atleos Corporation, Atlanta, GA (US)

(72) Inventors: Alexander William Whytock, Perthshire (GB); Conor Michael Fyfe, Carnoustie (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/022,207

(22) Filed: Jan. 15, 2025

(65) Prior Publication Data

US 2025/0157308 A1 May 15, 2025

Related U.S. Application Data

(63) Continuation of application No. 18/397,297, filed on Dec. 27, 2023, now Pat. No. 12,260,716, which is a continuation of application No. 18/103,623, filed on Jan. 31, 2023, now Pat. No. 11,941,954.

(51) Int. Cl.
*G07F 19/00* (2006.01)

(52) U.S. Cl.
CPC .......... *G07F 19/207* (2013.01); *G07F 19/209* (2013.01)

(58) Field of Classification Search
CPC ............................. G07F 19/207; G07F 19/209
USPC .......................................................... 235/379
See application file for complete search history.

(56) References Cited

U.S. PATENT DOCUMENTS

| | | | | |
|---|---|---|---|---|
| 11,941,954 | B1 * | 3/2024 | Whytock | ................ G07F 19/20 |
| 12,260,716 | B2 * | 3/2025 | Whytock | .............. G06F 21/554 |

OTHER PUBLICATIONS

U.S. Appl. No. 18/103,623 U.S. Pat. No. 11,941,954, filed Jan. 31, 2023, Replay Attack Detection.

U.S. Appl. No. 18/397,297, filed Dec. 27, 2023, Replay Attack Detection.

* cited by examiner

*Primary Examiner* — Daniel A Hess

(74) *Attorney, Agent, or Firm* — Schwegman Lundberg & Woessner, P.A.

(57) ABSTRACT

Images captured for components of a device are monitored for changes by evaluating a first region of interest in the images. Periodically, a command is sent to the device to move one or more of the components to a known position or state. A certain component or set of components associated with being moved based on the command is evaluated in a second region of interest in the images to determine if the corresponding component or set of components is in the known position or state within the images. When the corresponding component or set of components is not identified from the images in the known position or state, a security alert is raised for the device and security operations are processed on the host device.

20 Claims, 5 Drawing Sheets

REPLAY ATTACK DETECTION

CROSS-REFERENCE TO RELATED APPLICATION

This application is a continuation of U.S. patent application Ser. No. 18/397,297, filed Dec. 27, 2023, which is a continuation of U.S. patent application Ser. No. 18/103,623, filed Jan. 31, 2023, which applications and publications are incorporated herein by reference their its entirety.

BACKGROUND

It is normal and cost effective for "off the shelf" universal serial bus (USB) cameras to be used for security related to image recognition within security monitoring products. Such products can be attached by a criminal hiding their criminal activity. One such attack is a man-in-the-middle (MITM) video/image replay attack, in which a scene related to an idle condition is replayed during a period in which there was change. Thus, a potential scene change, that would ordinarily indicate a security concern, is replaced by an idle scene, thereafter any real-time change goes undetected, and an associated security alert is unreported.

SUMMARY

In various embodiments, methods and a system for replay attack detection are presented. Components of a device are monitored for changes by evaluating a first region of interest in images captured of the components. Periodically or on demand, one or more of the components are instructed to move to a known location or state. A second region of interest is evaluated in the images to determined if the components are in the known location or state that corresponds to the instruction sent to the device. When the components are not identified from the images as being in the known location or state, a security alert is raised for a potential replay attack and/or MITM attack.

DETAILED DESCRIPTION

Small USB cameras are often used to capture images of device components while a security application monitors a specific area of the images for changes indicating that the device is active, idle, or includes modifications that are unexpected. The camera streams the image to the application in real time for security evaluation. The cameras can be purchased at low cost, installed, and the images evaluated by the application with little programming effort. As a result, using images from the cameras as a security check is popular in the industry.

A criminal can utilize a replay attack to cause the security application to believe the images are coming from the security camera when in fact pre-captured images depicting an idle state of the device are sent to the host device. This MITM attack is common in the industry and is easy for a criminal to implement.

One device of particular susceptibility to MITM attacks is a card reader of a transaction terminal. The criminal places an internal skimming device within the card reader, a security application that utilizes an "off the shelf" USB camera receives images of components associated with the card reader device from the camera. The security application normally focuses on specific regions in the images to avoid false negatives, these specific regions are associated with components of the device that are normally not busy or active. Busy components and their regions in the images are ignored, which allows security application to avoid falsely reporting a presence of a potential skimming device. However, with a MITM attack, the security application can not even tell whether the regions associated with busy components are showing a presence of a skimming device because the images streamed of the components by the attacker to the security application are for an idle state of the card reader. Essentially, a MITM attack on a card reader defeats the low-cost security camera approach and a security alert will not be raised by any security application.

These issues are solved with the teachings provided herein and below. The low-cost camera approach is enhanced to include periodically or on demand sending an instruction to the device to move or locate certain components to a known position or state. The images from the camera are then evaluated in a new region of interest associated with the components that were instructed to move, if the components are not in a known position or state within the images as was instructed, then a security alert is raised for a MITM and/or replay attack.

Figure 1A:
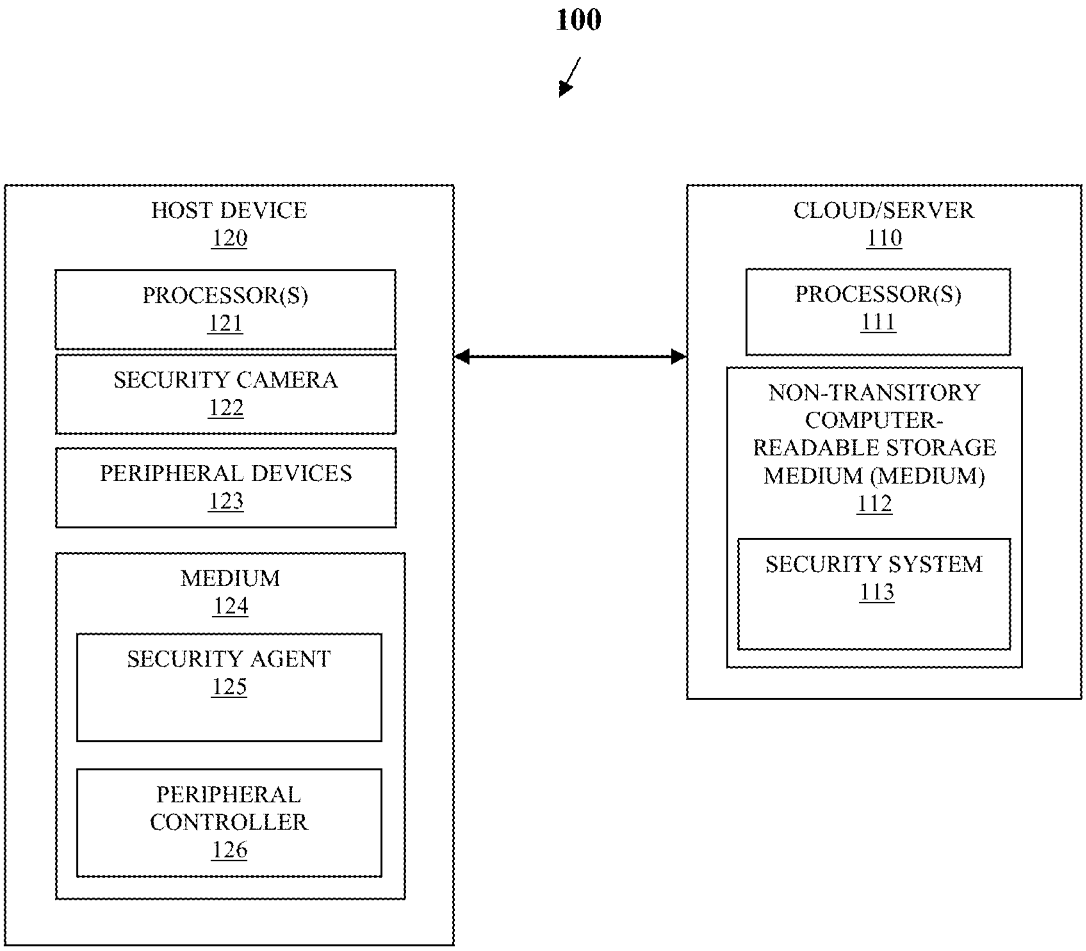
FIG. 1A is a diagram of a system for replay attack detection, according to an example embodiment.

FIG. 1A is a diagram of a system 100 for replay attack detection, according to an example embodiment. The system 100 is shown schematically in greatly simplified form, with only those components relevant to understanding of one or more embodiments (represented herein) being illustrated. The various components are illustrated, and the arrangement of the components are presented for purposes of illustration only. It is to be noted that other arrangements with more or less components are possible without departing from replay attack detection techniques presented herein and below.

Moreover, various components are implemented as one or more software modules, which reside in non-transitory storage and/or hardware memory as executable instructions that when executed by one or more hardware processors perform the processing discussed herein and below.

System 100 includes a cloud 110 or a server 110 (hereinafter just "server 110") and a host device 120. Server 110 includes one or more processors 111 and a non-transitory computer-readable storage medium 112 (herein after just "medium"), which includes instructions for a security system 113. The instructions when provided to processor 111 cause processor 111 to perform operations discussed herein and below with respect to 113.

Host device 120 includes one or more processors 121, a security camera 122, peripheral devices 123 and medium 124, which includes instructions for a security agent 125 and a peripheral controller 126. The instructions when provided to processor 121 cause processor 121 to perform operations discussed herein and below with respect to 125-126.

Peripheral controller 126 utilizes a peripheral device driver for a given peripheral device 123, which has its components being monitored by security agent 124 via images captured of the components by security camera 122. Peripheral controller 126 can be instructed at predefined intervals of time or on demand by security agent 125 to instruct the given peripheral device 123 to move its components to a known state or a known location using the corresponding device driver. Once the peripheral device 123 confirms that its components are in the known state or the known location, controller 126 sends a notice through an application programming interface (API) call to security agent 125.

Security agent 125 then inspects an image of the components for the peripheral 123 being monitored. However, rather than focusing on the non-busy areas of the components as would be the case when the peripheral 123 was not instructed to move to the known state, agent 125 focuses on an area or areas of the image associated with one of more of the components that are in the known state or known location. When security agent detects that the components represented in the image are not in the known state or known location in the areas evaluated, security agent 125 processes a customizable workflow on host device 120 to take appropriate security precautions for the peripheral device 123 and the host device 120. For example, the peripheral device can be shut down such that it is non operational, host device 120 can be shut down such that it is non operations, and/or a security alert can be sent to security system 113. Security system 113 may initiate or cause a technician or service engineer to be dispatched to host device 120 for inspection of the peripheral device 123.

In the example illustrations that follow, the peripheral device 123 being monitored is a card reader 123 and the host device 120 is a transaction terminal 120. It is to be noted that the peripheral device 123 monitored can include other peripherals 123 rather than a card reader 123, such as a cash dispenser 123, a cash recycler 123, a media depository 123, etc. The transaction terminal 120 can be an automated teller machine (ATM), a self-service terminal (SST), a point-of-sale (POS) terminal, or a kiosk.

Figure 1B:
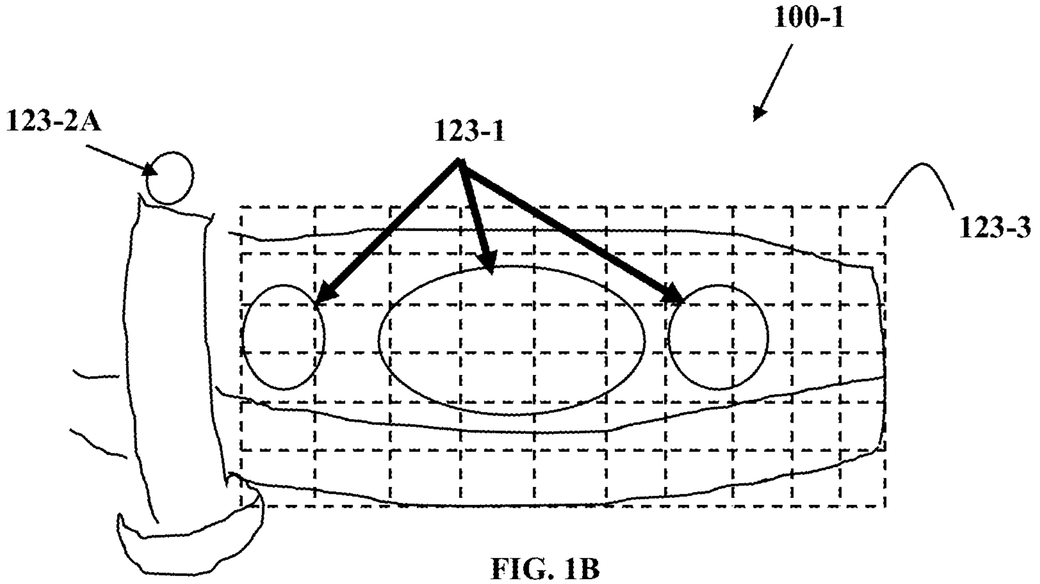
FIG. 1B is a diagram illustrating an image captured of components of a device with an area of interest evaluated to properly identify activity on the device, according to an example embodiment.

FIG. 1B is a diagram 100-1 illustrating an image captured of components of a device 123 with an area of interest evaluated to properly identify activity on the device 123, according to an example embodiment. Again, for purposes of illustration device 123 is referred to as a card reader 123.

123-1 illustrates components 123-1 and 123-2A of card reader 123 such as wheels, rollers, visible wires, a spindle, etc. Diagram 100-1 represents an image captured of components 123-1 and 123-2A. The grid 123-2 is a first area of interest evaluated by security agent 125 when peripheral controller 126 has not been instructed by agent 125 to move a component or set of components 123-1 and 123-2A to a known state or a known location within card reader 123. Agent 125 evaluates the area of interest 123-3 and determines change is present in the card reader 123 based on components 123-1.

Figure 1C:
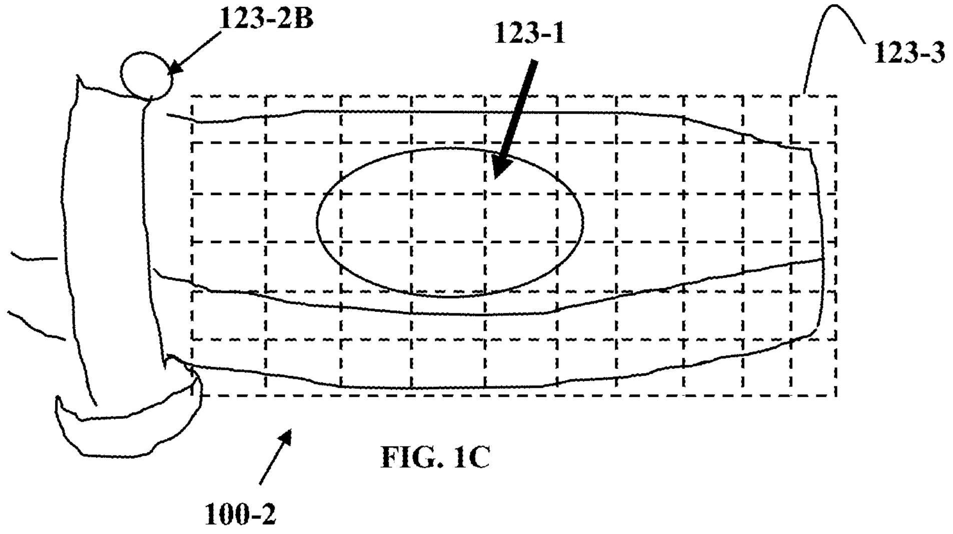
FIG. 1C is a diagram illustrating an image captured of the components with the area of interest evaluated to falsely conclude that activity was not present on the device, according to an example embodiment.

FIG. 1C is a diagram 100-2 illustrating an image captured of the components 123-1 and 123-2B with the area of interest 123-3 evaluated to falsely conclude that activity was not present on the device 123, according to an example embodiment. Notice that in diagram 100-2, spindle 123-2B is in a different orientation from that which was shown with spindle 123-2A in diagram 123-1. Agent 125 does not realize that change is taking place and may falsely identify the image of the components for card reader 123 as being in an idle state based on solely evaluating area of interest 123-3.

The situation associated with falsely identifying no change as illustrated in diagram 100-2, would not be remedied by existing security applications because focusing on components of card readers 123 that are busy results in too many false positives. Security agent 125 fixes this issue by instructing peripheral controller 126 to move the components of card reader 123 to a known state or known location and then switches from monitoring the non-busy areas of the image to a new area in the images where the components are located to see if the image is being spoofed or not by a MITM or a replace attack with a potential skimming device placed within the card reader by a criminal.

Figure 1D:
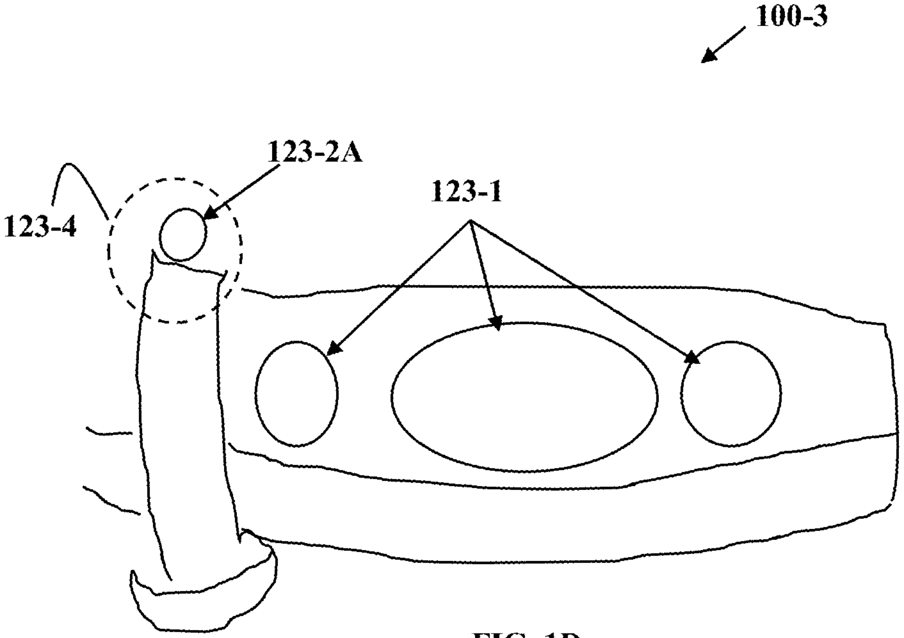
FIG. 1D is a diagram illustrating an image captured of the components with a new area of interest evaluated to properly identify activity on the device, according to an example embodiment.

FIG. 1D is a diagram 100-4 illustrating an image captured of the components 123-1 and 123-2A with a new area of interest 123-4 evaluated to properly identify activity on the device 123, according to an example embodiment. When security agent 125 has instructed peripheral controller 126 to move component 123-2A to a know state or known location within card reader 123, agent 125 switches from evaluating an original area of interest 123-3 to a new area of interest 123-4 within an image provided by camera 122.

Diagram 100-4 is a same image as was shown in diagram 100-1, however, agent 125 switched from evaluating region or area of interest 123-3 to a new region or area of interest 123-4 within the image. The new region or area of interest 123-4 comports with a given component 123-2A (e.g., card reader's spindle component) and its state or location. Based on this, agent 125 is able to identify whether or not there is activity correctly or not. Because if the image evaluated for spindle 123-2A does not show spindle 123-2A in an expected state, location, and/or orientation, agent 125 knows that there is potential a replay attack taking place which may be associated with a skimming device placed in the card reader 123.

Figure 1E:
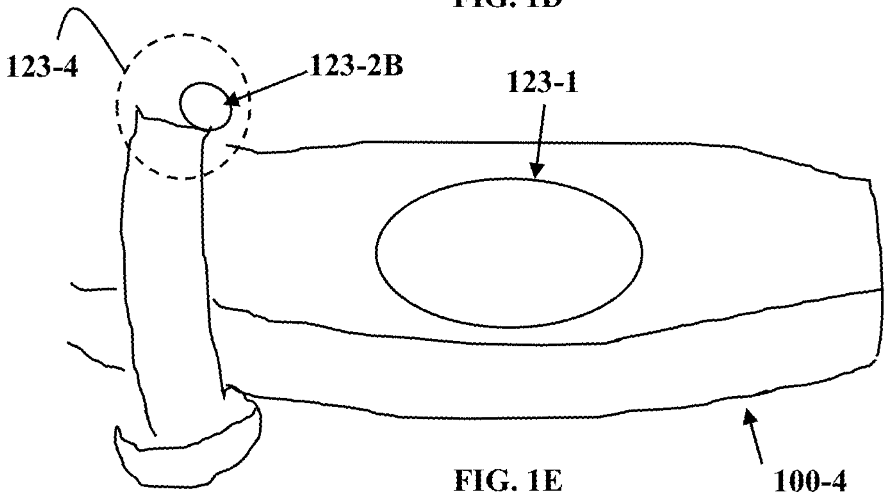
FIG. 1E is a diagram illustrating the image of FIG. 1C with the new area of interest evaluated to properly identify activity present on the device, according to an example embodiment.

FIG. 1E is a diagram 100-4 illustrating the image of FIG. 1C with the new area of interest 123-4 evaluated to properly identify activity present on the device 123, according to an example embodiment. Again, the image shown in diagram 100-2 is the same image shown in diagram 100-4; however, the area of interest being evaluated changed from 123-3 to 123-4 after agent 125 instructed peripheral controller 126 to move spindle 123-2B to a known state, location, and/or orientation within card reader 123.

Thus, agent 125 can tell if an image is being spoofed of the card reader 123 when spindle 123-2B is not in an orientation, a state, or a location as agent 125 instructed. This eliminates false negatives and false positives associated with just evaluating non-busy areas of images of peripheral devices 123.

Agent 125 and peripheral controller 126 provide a technique by which replay attacks can be identified from low-cost security camera approaches that monitor peripheral devices 123 of host devices 120 for a presence of unexpected change. The change can potentially indicate that device 123 is being tampered with by a criminal such as a skimming device placed in a card reader or other devices placed in depositories of a terminal 123.

Agent 125 periodically or on demand requests that peripheral controller 126 instruct one or more components of a monitored peripheral device 123 to move to a known state, location, or orientation. Agent 125 then switches from monitoring an initial area of interest to a new area of interest within the images provided by security camera 122. When the component(s) is/are not in the expected state, expected location, and/or expected orientation, agent 125 processes a customizable workflow to initiate security operations and security protocols. The security operations can include shutting down device 120, device 123, and/or sending a security alert to security system 113.

In an embodiment, a preset interval of time can be as an operational parameter of agent 125. During each interval of time, agent 125 instructs controller 126 to move components of a given peripheral 122 to one of several known states, locations, and/or orientations. The states, locations, and/or orientations can also be defined in settings associated with peripheral 122 that are processed by agent 125.

In an embodiment, agent 125 interacts with system 113 or a user administrative interface on host device 120 via API calls for purposes of receiving a request to move one or more components of a given peripheral device 123 to a known state, location, and/or orientation. Agent 125 then inspects subsequent images provided by camera 122 to see in a new area of interest associated with the component or components in the expected state, location, and/or orientation. This permits on demand requests to be received for security checks of peripheral device 123 outside of the preset and predefined intervals of time.

In an embodiment, when host device 120 is powered up or started for a business day of operation. Security agent 125 is configured to send the instruction to controller 126 for purposes of checking if a component or components of peripheral device 123 are being represented in images from camera 122 as they are expected to be. Security agent 125 during business operational hours performs the security checks on the components at predefined intervals of time and/or when instructed on demand from security system 113 and/or an administrator who operates an administrative interface on host device 120.

In an embodiment, the operations of peripheral controller 126 is subsumed within agent 125. That is, agent 125 includes the coding for interacting with a peripheral's device driver and instructing the peripheral device 123 to move one or more components to a stated state, location, and/or orientation.

In an embodiment, security system 113 subsumes the operations of agent 125 and/or controller 126. In this embodiment, camera 122 streams the images to a on-host storage location or a network storage location accessible to security system 113. In an embodiment, camera 122 streams the images directly to a memory buffer maintained and managed by security system 113. Security system 113 uses an API to instruct controller 126 or peripheral devices 123 to move components of devices 123 to known states, locations, or orientations.

In an embodiment, the peripheral devices 123 can include a media depository, a media recycler, and/or a card reader of a transaction terminal (host device 120). The transaction terminal is an ATM, an SST, a POS terminal, or a kiosk. In an embodiment, the security camera 122 is a USB camera installed within or on a housing of the terminal and configured to stream images captured of components of the peripherals 123 to a designated location and/or directly to agent 125.

Figure 2:
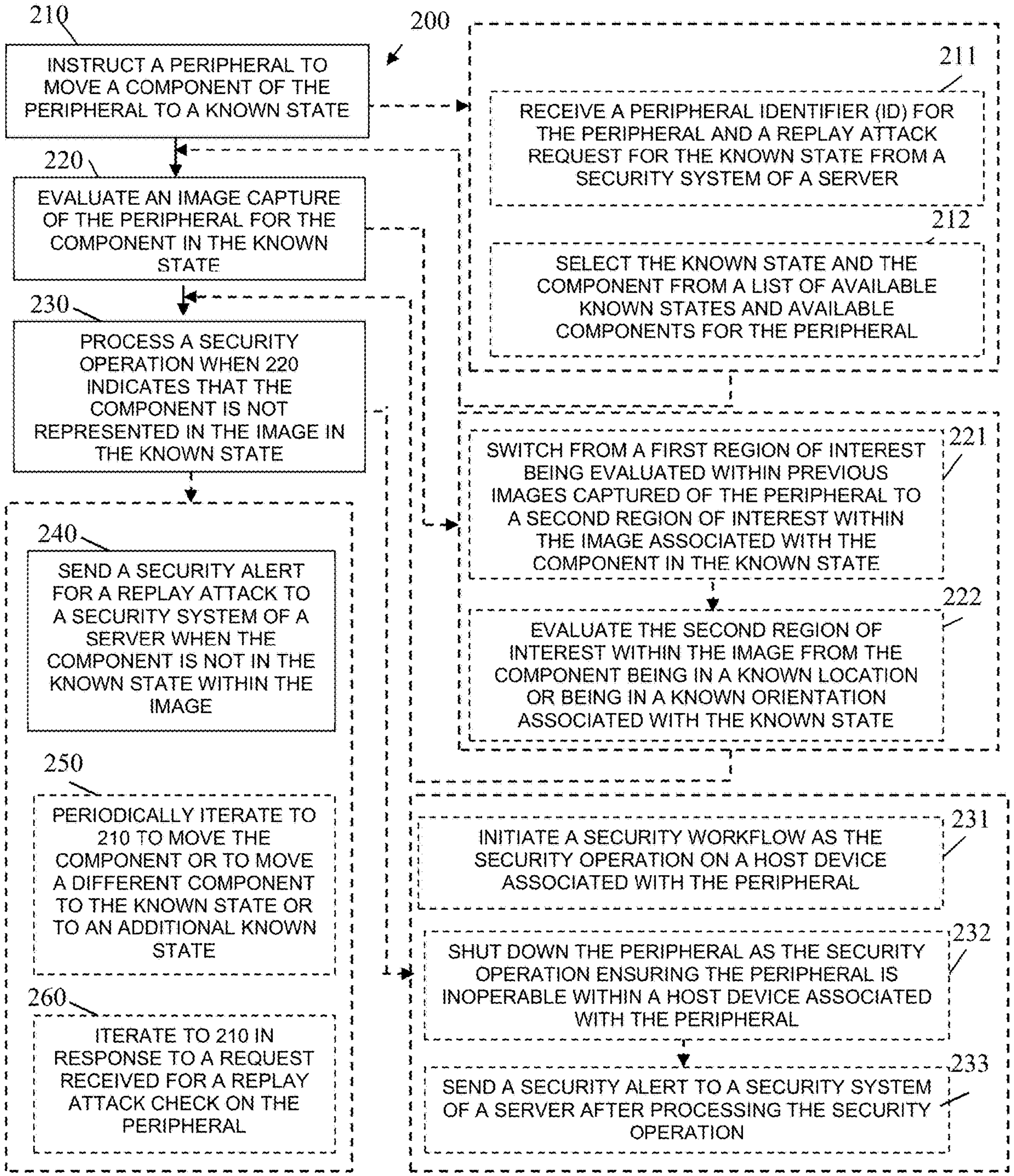
FIG. 2 is a flow diagram of a method for detecting replay attacks, according to an example embodiment.

The embodiments of FIGS. 1A, 1B, 1C, 1D, 1E, and other embodiments are now discussed with reference to the FIGS. 2-3. FIG. 2 is a flow diagram of a method 200 for detecting replay attacks, according to an example embodiment. The software module(s) that implements the method 200 is referred to as a "security agent." The security agent is implemented as executable instructions programmed and residing within memory and/or a non-transitory computer-readable (processor-readable) storage medium and executed one or more hardware processors of one or more hardware computing devices. The processors of the devices that execute the security agent are specifically configured and programmed to process the security agent. The security agent has access to one or more networks during its processing. The networks can be wired, wireless, or a combination of wired and wireless.

In an embodiment, the device that executes the security agent is terminal 110. In an embodiment, the terminal 110 is an ATM, an SST, a POS terminal, or a kiosk. In an embodiment, the security agent is any combination of agent 125 and controller 126.

At 210, the security agent instructs a peripheral 123 to move at least one component of the peripheral 123 to a known state. The component can include belts, wheels, spindles, rollers, etc. associated with the peripheral 123. The peripheral 123 can include a card reader, a media depository, or a media recycler.

In an embodiment, at 211, the security agent receives a peripheral identifier and a replay attack check request for the known state from a security system 113. This is an instance where a remotely connected server 110 or cloud 110 is making a request for a replay attack check on the peripheral device 123 to the security agent, which executes on a host device 120. The peripheral 123 is integrated into and interfaced with the host device 120.

In an embodiment, at 212, the security agent selects the known state and the component from a list of available known states and available components for the peripheral 123. This is a case where the known states and components being checked for a security threat are predefined and selected by the security agent before the peripheral 123 is instructed to move to the known state using a device driver associated with the peripheral 123.

At 220, the security agent evaluates an image captured of the peripheral for the component to in the known state. The image is provided by a camera 122 after the peripheral 123 confirms it is in the known state such that the image should show the component has moved to the known state.

In an embodiment, at 221, the security agent switches from a first region of interest being evaluated within previous images captured of the peripheral 123 to a second region of interest within the image associated with the component in the known state. That is, the second region of interest is associated with a busy component of the peripheral 123, which is typically ignored when evaluating previous images of the peripheral 123 for changes associated with non-busy components of the peripheral 123.

In an embodiment of 221 and at 222, the security agent evaluates the second region of interest within the image for the component being in a known location or being in a known orientation associated with the known state. Here, the security agent is looking for movements or changes in orientation for the component and depicted in the image vis-a-vis an idle or previous state depicted in the previous images to identify whether the component is in the known state.

At 230, the security agent processes a security operation when 220 indicates that the component is not represented or depicted in the image in the known state or when 220 indicates the component did not move or change orientation from a previous or current state in a previous image relative to the image captured after the peripheral 123 was instructed to move.

In an embodiment, at 231, the security agent initiates a security workflow as the security operation. The workflow processed on a host device 120 associated with the peripheral 123.

In an embodiment, at 232, the security agent shuts down or disables the peripheral 123 as the security operation. This ensures the peripheral 123 is inoperable within the host device 120.

In an embodiment of 232 and at 233, the security agent sends a security alert to a security system 113 after processing the security operation. Security system 113 dispatches a technician or a service engineer to inspect the host device 120, the camera, and the peripheral 123 based on receiving the security alert from security agent.

In an embodiment, at 240, the security agent sends a security alert to a security system 113. The security alert indicates to system 113 that a potential or likely replay attack is underway when the component is not in the known state within the image.

In an embodiment, at 250, the security agent periodically iterates to 210 to move the component or to move a different component to the known state or to an additional known state. So, the security agent are preconfigured intervals of time reprocesses 210-230 to look for replay attacks.

In an embodiment, at 260, the security agent iterates to 210 in response to a request received for a replay attack check on the peripheral 123. The request can come through an administrative interface of host device 120 or can come through security system 113 of cloud/server 110. This is an on-demand check that can be in addition to periodic checks being performed by the security agent.

Figure 3:
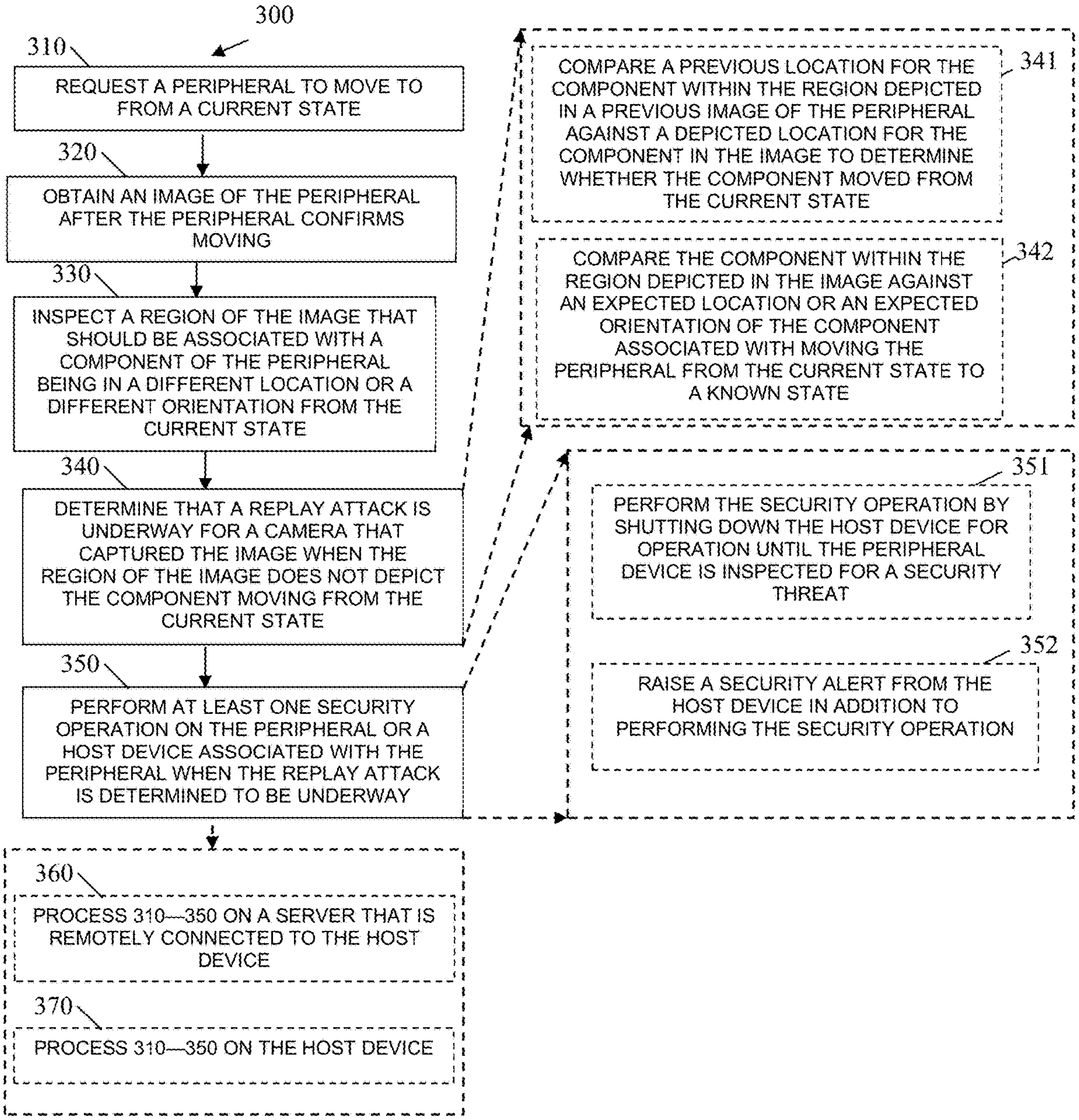
FIG. 3 is a flow diagram of another method for detecting replay attacks, according to an example embodiment.

FIG. 3 is a flow diagram of another method 300 for detecting replay attacks, according to an example embodiment. The software module(s) that implements the method 300 is referred to as a "replay detector." The replay detector is implemented as executable instructions programmed and residing within memory and/or a non-transitory computer-readable (processor-readable) storage medium and executed by one or more hardware processors of one or more hardware devices. The processors of the devices that execute the replay detector are specifically configured and programmed to process the replay detector. The replay detector has access to one or more networks during its processing. The networks can be wired, wireless, or a combination of wired and wireless.

In an embodiment, the device that executes the replay detector is cloud 110 or server 110. In an embodiment, the device that executes the replay detector is host device 120. In an embodiment, the host device is transaction terminal 120. In an embodiment, terminal 120 is an ATM, an SST, a POS terminal, or a kiosk.

The replay detector shows another and, in some ways, an enhanced processing perspective from that which was shown above with method 200. In an embodiment, the replay detector is any combination of agent 125, controller 126, security system 113, and/or method 200.

At 310, the replay detector request a peripheral 123 to move from a current state to a different state. This can be an instruction to move even a small amount from its current position or current state.

At 320, the replay detector obtains an image of the peripheral 123 after the peripheral 123 confirms that is has moved. Confirmation can be obtained from a device driver of the peripheral 123 on a host device 120 associated with the peripheral 123.

At 330, the replay detector inspects a region of the image that should be associated with a component of the peripheral 123 being in a different location or a different orientation from the current state. That is, a previously taken image of the peripheral 123 in the current state when compared against the image taken after the peripheral 123 should show the component moved or changed its orientation.

At 340, the replay detector determines that a replay attack is underway for a camera 122 that captured and provided the image to the replay detector when the region of the image does not depict the component moving from the current state or state captured in previous images. When the previous image depicts the component in a certain orientation or certain location that matches the depiction of the component in the image taken after the peripheral 123 was instructed to move, the replay detector suspects the replay attack.

In an embodiment, at 341, the replay detector compares a previous location for the component within the region in a previous image of the peripheral 123 against a depicted location for the component in the image to determine whether the component moved from the current state. The region associated with the component permits replay detector to quickly evaluate and compare the previous image with the image taken after 310.

In an embodiment, at 342, the replay detector compares the component within the region depicted in the image against an expected location or an expected orientation of the component. When the expected location or the expected orientation is not present, the replay detector assumes a replay attack is underway posing a security threat to the host device 120 and the peripheral 123.

At 350, the replay detector performs or processes at least one security operation on the peripheral 123 or on the host device 120. Again, the peripheral 123 is integrated within and interfaced to the host device 120.

In an embodiment, at 351, the replay detector performs the security operation by shutting down the host device 120 for operation until the peripheral device 123 is inspected for a security threat. In an embodiment, the security threat is a replay attack which potentially is associated with a skimming device inserted into the peripheral 123 when the peripheral 123 is a card reader of the host device 120.

In an embodiment, at 352, the replay detector raises a security alert from the host device 120 in addition to performing the security operation. For example, the security alert is sent over a secure network connection to security system 113. Security system 113, in response to receiving the security alert, dispatches a technician or service engineer to visually inspect the peripheral 123 for the security threat.

In an embodiment, at 360, the replay detector is processed or executed on a server 110 or cloud 110. Server/Cloud 110 is remotely connected over a secure network connection to the host device 120.

In an embodiment, at 360, the replay detector is processed or executed on the host device 120. That is, the images captured by camera 122 are evaluated on the host device using replay detector.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving an image of a card reader peripheral device captured by a camera;

evaluating a first region of interest in the image for changes associated with non-busy components of the card reader peripheral device;

instructing the card reader peripheral device to move at least one busy component from a current state to a different state;

evaluating a second region of interest in the image associated with the at least one busy component after instructing the card reader peripheral device to move; and processing a security operation when the second region of interest does not show the at least one busy component in the different state.

2. The method of claim 1, wherein evaluating the second region of interest includes comparing the at least one busy component against an expected orientation associated with the different state.

3. The method of claim 1, wherein evaluating the second region of interest includes comparing the at least one busy component against an expected location associated with the different state.

4. The method of claim 1, wherein the at least one busy component includes at least one of: wheels, rollers, or a spindle of the card reader peripheral device.

5. The method of claim 1, wherein processing the security operation includes shutting down the card reader peripheral device.

6. The method of claim 1, wherein processing the security operation includes sending a security alert to a security system.

7. The method of claim 1, wherein instructing the card reader peripheral device includes selecting the different state from a list of available states for the at least one busy component.

8. The method of claim 1, wherein instructing the card reader peripheral device occurs at predefined intervals of time.

9. The method of claim 1, wherein instructing the card reader peripheral device occurs in response to receiving a request for a security check.

10. The method of claim 1, wherein evaluating the first region of interest includes monitoring the non-busy components for potential security threats.

11. The method of claim 1, wherein processing the security operation includes dispatching a service technician to inspect the card reader peripheral device.

12. A method, comprising:

monitoring a card reader peripheral device using a camera that captures images of components of the card reader peripheral device;

evaluating a first area of interest in the images for changes associated with non-busy components;

periodically instructing the card reader peripheral device to move at least one busy component to a known position;

switching from evaluating the first area of interest to evaluating a second area of interest in the images after instructing the card reader peripheral device to move the at least one busy component; and raising a security alert when the second area of interest does not show the at least one busy component in the known position.

13. The method of claim 12, wherein monitoring includes streaming the images from the camera to a security application.

14. The method of claim 12, wherein periodically instructing includes receiving confirmation from the card reader peripheral device that the at least one busy component has moved.

15. The method of claim 12, wherein switching includes analyzing the second area of interest for an expected state of the at least one busy component.

16. The method of claim 12, wherein raising the security alert includes notifying a remote security system of a potential replay attack.

17. The method of claim 12, wherein raising the security alert includes initiating a security workflow on a host device associated with the card reader peripheral device.

18. The method of claim 12, wherein monitoring includes storing the images in a memory buffer accessible to a security system.

19. A system, comprising:

a host device including a camera and a card reader peripheral device; and a processor configured to execute instructions to perform operations comprising:

monitoring first images captured by the camera of non-busy components of the card reader peripheral device;

determining changes in the non-busy components from the first images;

periodically instructing the card reader peripheral device to move busy components from an idle state;

evaluating second images captured by the camera after instructing the card reader peripheral device to move the busy components; and processing a security operation when the second images do not show movement of the busy components from the idle state.

20. The system of claim 19, wherein the host device is a transaction terminal and the processor is further configured to execute instructions to perform operations comprising sending a security alert to a remote security system when the second images do not show the movement of the busy components.

* * * * *